United States Patent
Friedman et al.

(10) Patent No.: US 10,627,208 B2
(45) Date of Patent: Apr. 21, 2020

(54) LOW RESISTANCE SURFACE CONTACT TOPOGRAPHY MAPPING

(71) Applicant: General Electric Company, Schenectady, NY (US)

(72) Inventors: Michael E. Friedman, Simpsonville, SC (US); Jonathan Tilley, Simpsonville, SC (US); Brian Patrick Senkiw, Greenville, SC (US); Bryan Williams, Greenville, SC (US); Andrew Joseph Colletti, Greenville, SC (US)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 15/587,580

(22) Filed: May 5, 2017

(65) Prior Publication Data

US 2018/0321025 A1 Nov. 8, 2018

(51) Int. Cl.
*G01B 7/28* (2006.01)
*F01D 5/06* (2006.01)
*F01D 21/00* (2006.01)

(52) U.S. Cl.
CPC ............... *G01B 7/28* (2013.01); *F01D 5/06* (2013.01); *F01D 21/003* (2013.01); *F05D 2260/80* (2013.01); *F05D 2260/83* (2013.01)

(58) Field of Classification Search
CPC . G01B 7/28; F01D 5/06; F01D 21/003; F01D 2220/32
See application file for complete search history.

(56) References Cited

U.S. PATENT DOCUMENTS

| | | | |
|---|---|---|---|
| 5,932,947 A * | 8/1999 | Kim | F16C 32/0444 310/90.5 |
| 6,050,160 A * | 4/2000 | Newell | B23B 5/04 82/112 |
| 6,341,419 B1 | 1/2002 | Forrester | |
| 7,792,600 B2 | 9/2010 | Borneman et al. | |
| 8,371,178 B1 * | 2/2013 | Wall | F02K 9/48 73/1.09 |
| 9,261,382 B2 * | 2/2016 | Jiang | G01D 5/14 |
| 9,334,739 B2 | 5/2016 | Kepler et al. | |
| 2001/0004849 A1 * | 6/2001 | Jin | G01D 5/2451 73/862.331 |
| 2007/0282548 A1 * | 12/2007 | Ling | G01M 13/025 702/65 |
| 2008/0092641 A1 * | 4/2008 | Cahill | B60T 8/52 73/121 |
| 2009/0171491 A1 * | 7/2009 | Borneman | F01D 5/027 700/98 |
| 2015/0260794 A1 * | 9/2015 | Athikessavan | G01R 31/343 702/58 |
| 2016/0184155 A1 * | 6/2016 | Streeter | A61G 7/05769 700/282 |
| 2017/0175584 A1 * | 6/2017 | Tan | F01D 25/28 |

* cited by examiner

*Primary Examiner* — Jeff W Natalini
(74) *Attorney, Agent, or Firm* — Dority & Manning, P.A.

(57) ABSTRACT

A system and method for testing rotor stack assemblies having a plurality of rotor disks is disclosed. A measurement system for measuring at least one electrical characteristic of the plurality of rotor disks is used with a computer electronically connected to the measurement system for capturing data from the measurement system. Software associated with the computer transforms the data into output used to determine flange joint contact topography in the plurality of rotor disks.

12 Claims, 6 Drawing Sheets

LOW RESISTANCE SURFACE CONTACT TOPOGRAPHY MAPPING

FIELD OF THE DISCLOSURE

The disclosure relates generally to turbomachines, and more specifically to electrical methods and systems for determining contact topography and tilt in rotor stack assemblies.

BACKGROUND OF THE DISCLOSURE

An industrial turbomachine, such as a gas turbine for generating electricity, generally comprises a plurality of bladed rotor disks and one or more spacer elements, which are aligned along an axis and frontally coupled. The disks and spacer elements are sandwiched by at least one tie rod or bolt. The disks are provided with respective arrays of blades and each defines a compressor or turbine rotor stage.

A multistage assembled compressor rotor includes several rotor disks axially joined together at corresponding annular flanges. The flange contact faces are typically ground to a very tight tolerance flatness in an effort to minimize rotor eccentricity and tilt. During the stacking process, it is possible for the flange faces to be held slightly apart by foreign debris, face damage, thermal irregularities, and other anomalies, thereby forming an air gap between at least a portion of adjoining flange faces. Additionally, each rotor is separately manufactured and is subject to eccentricity between its forward and aft mounting flanges, and is also subject to non-perpendicularity or tilt of its flanges relative to the axial centerline axis of the turbomachine. Individual rotors typically vary in configuration for aerodynamic, mechanical, and aeromechanical reasons, which increases the complexity and difficulty in reducing undesirable eccentricity.

Both eccentricity and tilt of the rotor annular flanges are random and preferably limited to relatively small values. However, the assembly of the individual rotors with their corresponding flange eccentricities and tilts is subject to stack-up and the possibility of significantly larger maximum eccentricity and tilt collectively due to the individual eccentricities and tilts. When the rotor assembly is mounted for mechanical runout testing, adjoining flange joints between individual rotors of the assembly may have tilt and eccentricity from the centerline axis which exceeds the specified limit for the rotors due to stack-up. In this case, the rotor assembly must be torn down and reassembled in an attempt to reduce stackup eccentricities and tilt to an acceptable level.

Upon testing of the assembled rotor, either the net eccentricity and tilt or an inter-rotor eccentricity and tilt may nevertheless exceed the specified limit. This would require teardown of the rotor assembly and re-assembly in an attempt to reduce net eccentricity and stage eccentricity to within acceptable limits. Disassembling and reassembling the rotor are extremely costly during initial production and rebuilding, even of the order of several weeks. Accordingly, it is desired to improve the assembly process of multiple rotors for minimizing eccentricity and tilt thereof from a common axial centerline axis.

BRIEF DESCRIPTION OF THE DISCLOSURE

Aspects and advantages of the disclosure will be set forth in part in the following description, or may be obvious from the description, or may be learned through practice of the disclosure.

In one embodiment, a system for testing rotor stack assemblies having a plurality of rotor disks is disclosed. A measurement system for measuring at least one electrical characteristic of the plurality of rotor disks is used with a computer electronically connected to the measurement system for capturing data from the measurement system. Software associated with the computer transforms the data into output used to determine flange joint contact topography in the plurality of rotor disks.

In another embodiment, a method for testing a rotor stack having a plurality of rotor disks is disclosed as having the steps of; measuring at least one electrical characteristic of a plurality of rotor disks with a measurement system; obtaining data from the measuring step; transforming the data into output used to determine flange joint contact topography in the plurality of rotor disks; and mapping the output using software.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which.

Figure 1:
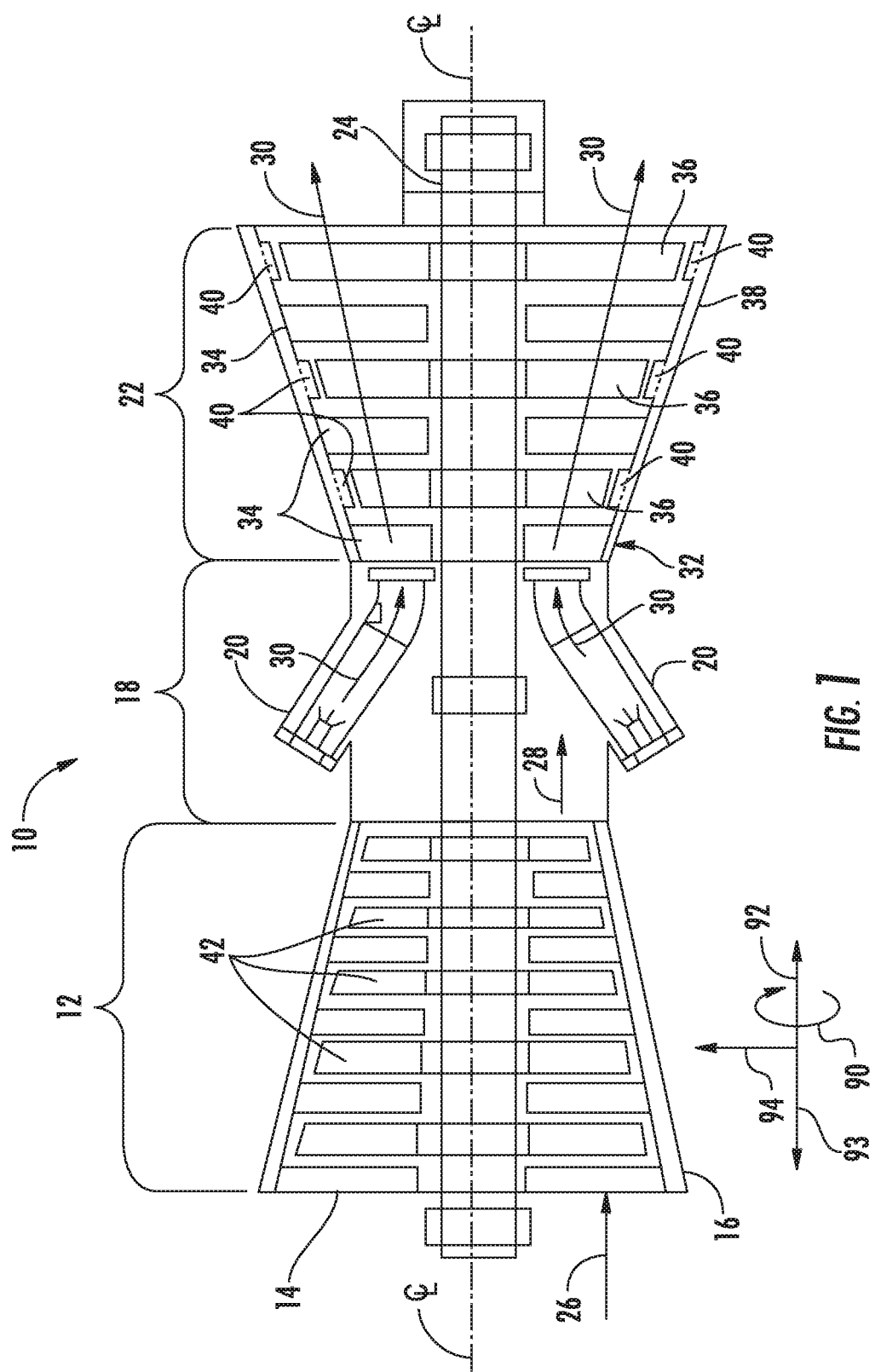
FIG. 1 is a schematic of a typical turbomachine gas turbine having rotor disk assemblies suitable for embodiments disclosed herein.

Repeat use of reference characters in the present specification and drawings is intended to represent the same or analogous features or elements of the present disclosure.

DETAILED DESCRIPTION OF THE DISCLOSURE

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component. The term "low resistance", as used herein, is defined as a resistance value less than about 1 ohm, which requires test equipment that will minimize errors introduced by the test lead resistance and/or contact resistance between the probe and the test specimen. The lower range on low resistance test equipment can resolve to about 0.1 micro-ohms (μΩ).

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of an industrial gas turbine for purposes of illustration, one of ordinary skill in the art will readily appreciate that embodiments of the present invention may be applied to any turbomachine including but not limited to an aero-derivative turbine, marine gas turbine as well as an aero engine turbine, unless specifically recited in the claims.

For testing eccentricity and tilt, an electrical low resistance testing system and method is disclosed herein for large cross-sectional area mechanical joints, for example rotor flange joints, where mechanical contact of the faces is important for structural reasons as well as alignment. While electrical resistance measurements have been frequently used in the electrical industry for testing equipment such as motor armature windings, bus bars or high current joints, transformers, and aircraft assembly ground planes, adapting low resistance test techniques to determine mechanical contact topography is disclosed herein.

Referring now to the drawings, wherein like numerals refer to like components, FIG. 1 illustrates a turbomachine example being a gas turbine 10, as may incorporate various embodiments of the present invention. Directional orientation, consistent in all figures, is defined as circumferential direction 90, downstream axial direction 92, upstream axial direction 93, and radial direction 94. As shown, the gas turbine 10 generally includes a compressor section 12 having an inlet 14 disposed at an upstream end of the gas turbine 10, and a casing 16 that at least partially surrounds the compressor section 12. The gas turbine 10 further includes a combustion section 18 having at least one combustor 20 downstream from the compressor section 12, and a turbine section 22 downstream from the combustion section 18. As shown, the combustion section 18 may include a plurality of the combustors 20. A shaft 24 extends axially through the gas turbine 10.

In operation, air 26 is drawn into the inlet 14 of the compressor section 12 and is progressively compressed to provide a compressed air 28 to the combustion section 18. Rotating bladed compressor rotor disks 42 provide compressive forces to create the compressed air 28. The compressed air 28 flows into the combustion section 18 and is mixed with fuel in the combustor 20 to form a combustible mixture. The combustible mixture is burned in the combustor 20, thereby generating a hot gas 30 that flows from the combustor 20 across a first stage 32 of turbine nozzles 34 and into the turbine section 22. The turbine section generally includes one or more rows of rotor blades 36 axially separated by an adjacent row of the turbine nozzles 34. The rotor blades 36 are coupled to the rotor shaft 24 via a rotor disk. A turbine casing 38 at least partially encases the rotor blades 36 and the turbine nozzles 34. Each or some of the rows of rotor blades 36 may be circumferentially surrounded by a shroud block assembly 40 that is disposed within the turbine casing 38. The hot gas 30 rapidly expands as it flows through the turbine section 22. Thermal and/or kinetic energy is transferred from the hot gas 30 to each stage of the rotor blades 36, thereby causing the shaft 24 to rotate and produce mechanical work. The shaft 24 may be coupled to a load such as a generator (not shown) so as to produce electricity. In addition or in the alternative, the shaft 24 may be used to drive the compressor section 12 of the gas turbine.

Figure 2:
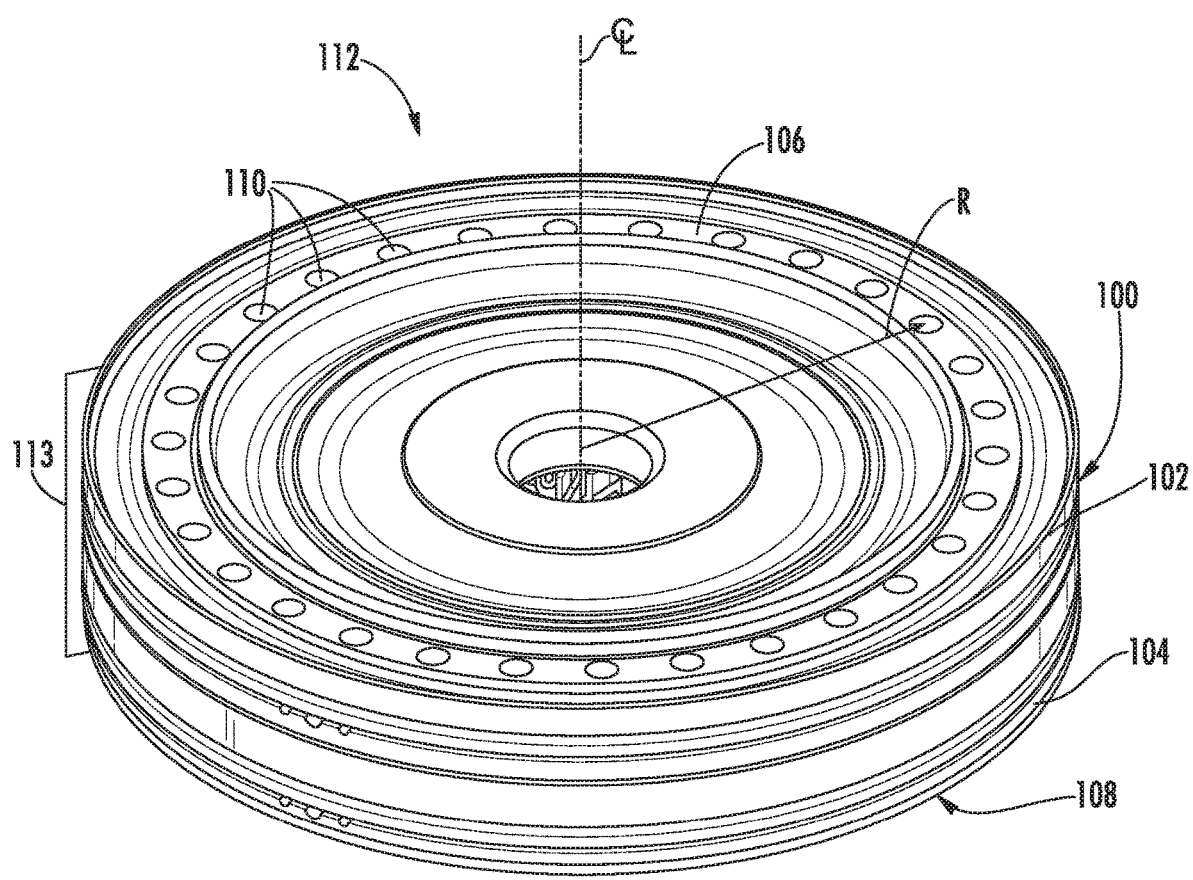
FIG. 2 is a perspective of a rotor disk assembly suitable for embodiments disclosed herein.
Figure 3:
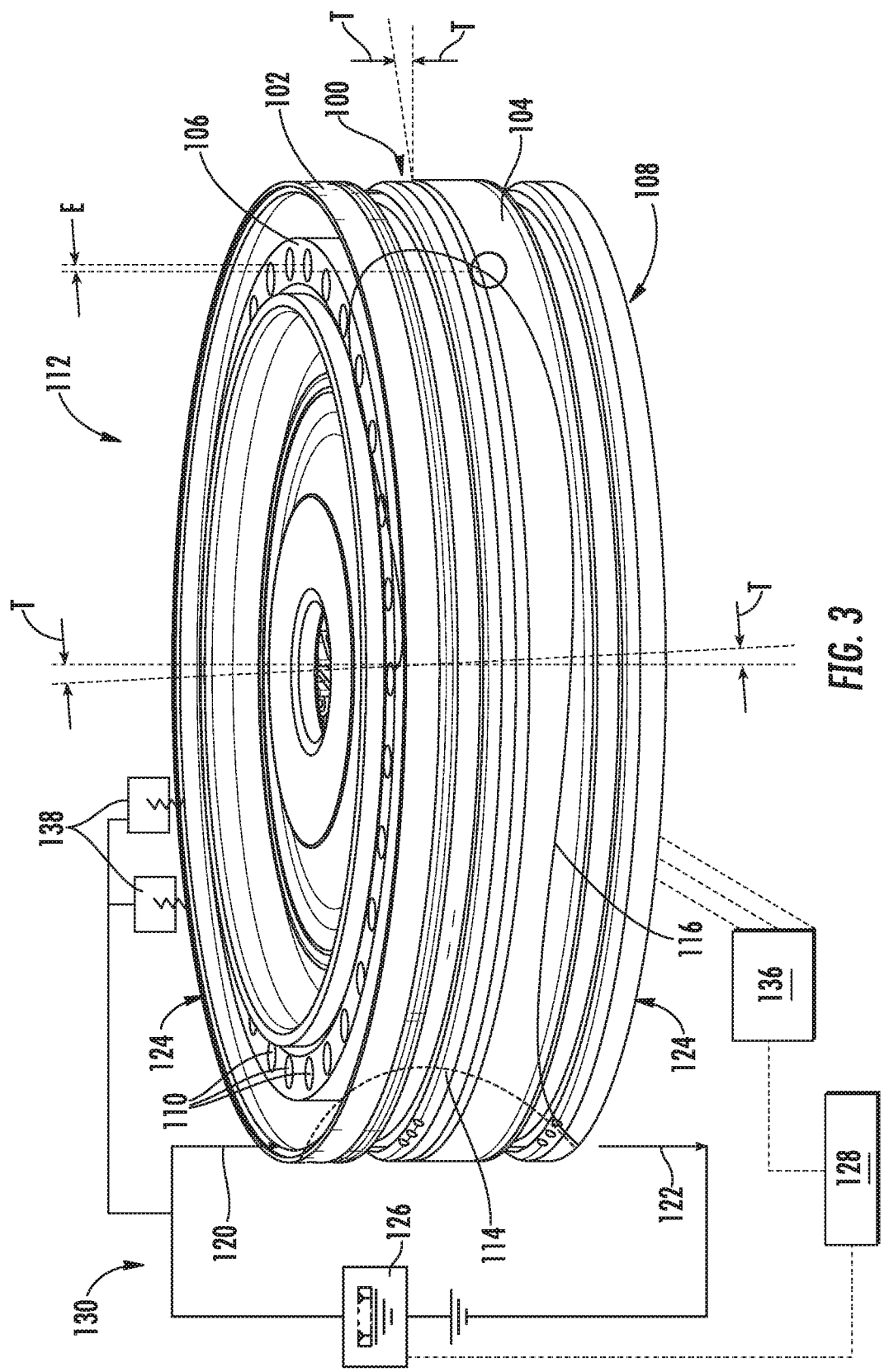
FIG. 3 is a perspective of an exemplary rotor disk assembly and a measurement system schematic.

An exemplary annular flange joint 100 between two adjoining rotor disks, first rotor disk 102 and second rotor disk 104, is illustrated in more detail in FIG. 2. Adjoining rotor disks can be two or more individual disks that make up a plurality of rotor disks 113. The measurement system 130 can be applied to measure annular flange joint contact between two or more rotor disks. Intermediate joint testing can also be performed on rotor stack assemblies 112 having three or more rotors. The aft end of the first annular flange 106 adjoins the forward end of the second annular flange 108 in a rotor stack assembly 112. Bolt holes 112 are arranged circumferentially at a common radius R from the centerline axis CL, subject to manufacturing tolerances. FIG. 3 further illustrates the two exemplary adjoining rotor disks 102, 104 having eccentricity (E) and non-perpendicularity or tilt (T) of the rotor disks thereof which affect assembly of the individual rotor disks and the concentricity thereof. Since the two individual rotor disks 102, 104 can be axially spaced apart from each other by spacer sections in a complete assembly, they are subject to relative eccentricity (E) between the nominal centers thereof. The eccentricities (E) are additive from rotor disk to rotor disk and affect the concentricity between ends of the rotor assembly.

Furthermore, the first and second annular flanges 106, 108 are preferably perpendicular to the centerline axis CL, yet due to manufacturing tolerances often have a non-perpendicular tilt (T) relative to the centerline axis. Tilt (T) can be enhanced when the adjoining annular flange 106, 108 faces at the annular flange joint 100 are held slightly apart by foreign debris, face damage, thermal irregularities, and other anomalies, thereby forming an air gap between at least a portion of adjoining annular flange faces. The non-perpendicularity tilt (T) is a relative angular deviation between any two adjoining annular flanges 106, 108. Accordingly, the combined effect of rotor eccentricity (E) and tilt (T) can modify the surface contact topography of annular flange joints 100. This modification can be measured and used for improving the assembly of the rotor disks by performing surface contact topography mapping of the annular flange joints 100 during rotor stacking. Identifying contact topography anomalies early in the rotor disk stack assembly process enables alignment correction prior to runout testing.

Figure 6:
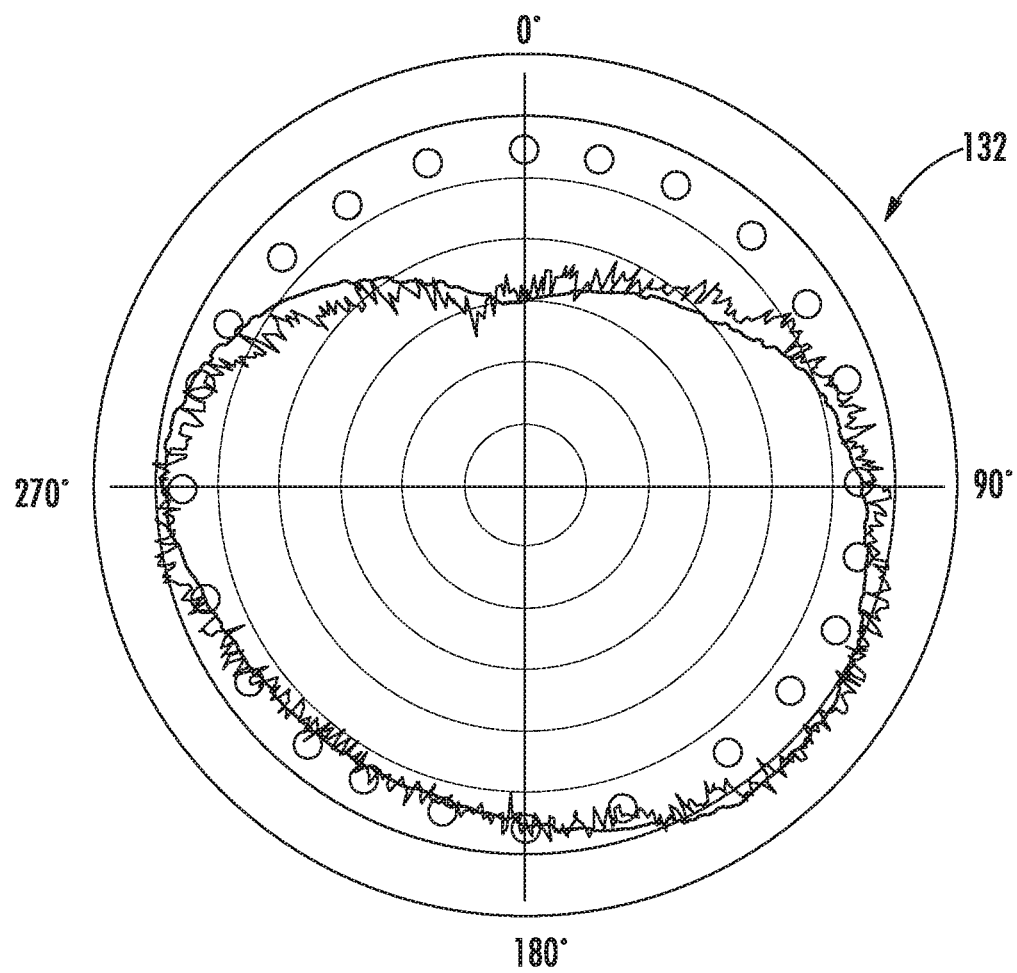
FIG. 6 is an exemplary polar plot output mapping contact topography of an annular flange joint.

FIG. 3 illustrates two of the many possible conductive paths that current from low resistance testing can pass through the annular flange joint 100 for contact topography mapping. Current probe 120 and potential probe 122 are connected near the outer rim 124 of the first rotor disk 102 and second rotor disk 104, respectively. The current probe 120 and potential probe 122 make electrical connections between the low resistance ohmmeter 126 and the rotor stack assembly 112 thereby configuring a measurement system 130. The probes 120, 122 can be configured as Kelvin clips, C-clamps, fixed points, helical spring points, and mixtures thereof. First conductive path 114 is considered a direct conductive path indicating that the annular flange joint 100 contact topography is within specification. Second conductive path 116 is considered an indirect conductive path indicating that the annular flange joint 100 contact topography is not within specification, likely caused by tilt and/or eccentricity at the annular flange joint 100. The probes 120, 122 can be connected to multiple positions on the rotor stack assembly 112, using multiple ohmmeters or a single ohmmeter with multiple leads, to enable a computer 128 to be electronically connected to the measurement system 130 for capturing data from the measurement system 130. Software associated with the computer 128 can transform the data into output 132 used to determine flange joint contact topography in the plurality of rotor disks 113, for example as seen in FIG. 6. Output 132 can be generated by the computer 126 performing electrical signature analysis (ESA) of at least one electrical characteristic of the rotor stack assembly 112. ESA techniques can include Current Signature Analysis (CSA), Voltage Signature Analysis (VSA), Extended Park's Vector Approach (EPVA), Instantaneous Power Signature Analysis (IPSA), and mixtures thereof. ESA involves a set of comparisons with previously stored topography, within specification, for the rotor stack assembly 112 under analysis. Electrical characteristics of the rotor stack assembly 112 that can be used for ESA include electrical current, voltage, capacitance, resistance and mixtures thereof.

Figure 4:
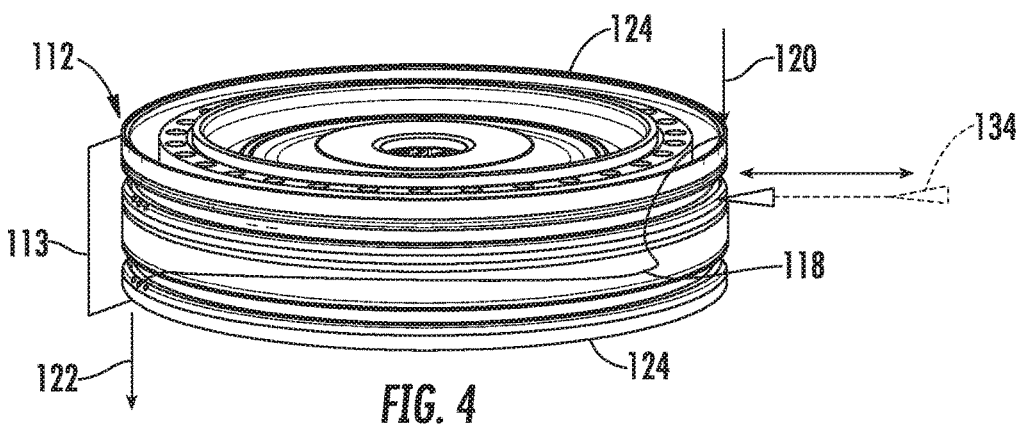
FIG. 4 is a perspective of an exemplary rotor disk assembly.
Figure 5:
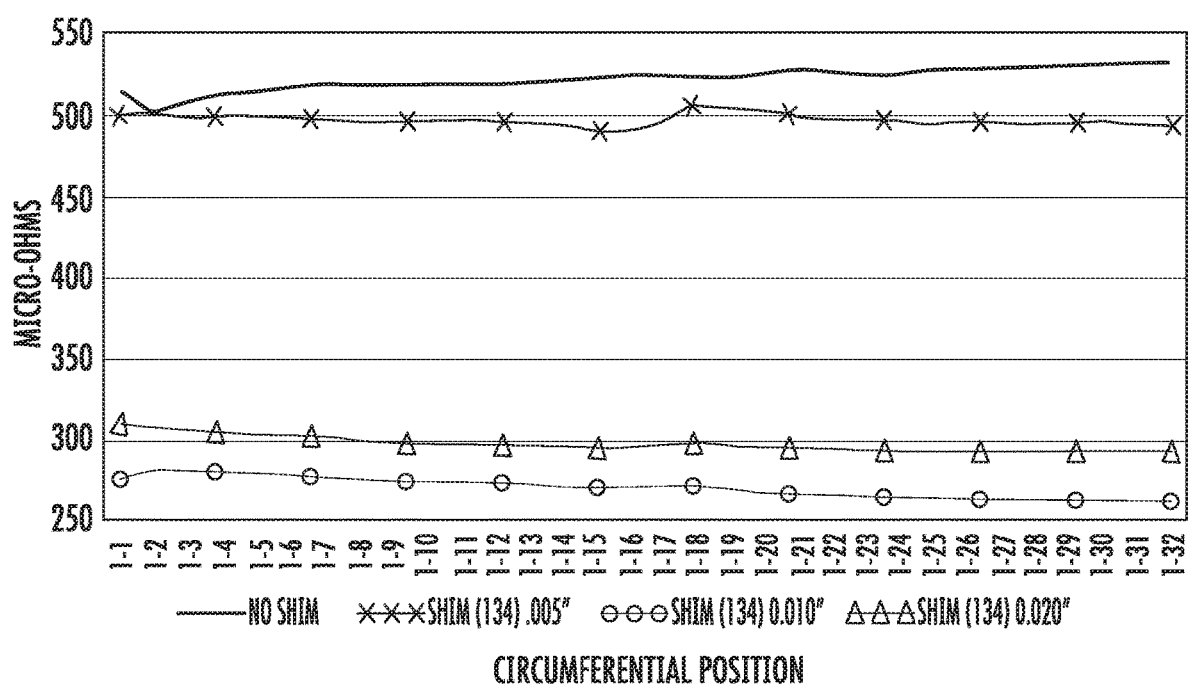
FIG. 5 is a graph of circumferential position vs. microohms from an exemplary measurement system.

In the example shown in FIGS. 4 and 5, rotor disks were assembled into a rotor stack assembly 112 with shims 134 of various thickness positioned in the joint between the stacked rotor disks forcing an air gap to open between annular flange faces of adjoining rotor disks, i.e. at the annular flange joint 100. An in situ annular flange contact inspection was performed utilizing high DC amperage and low voltage, to measure micro-resistance (µΩ) values. By attaching the input current probe 120 and potential probe 122 in predetermined positions near the outer rim 124 of the rotor stack assembly 112, the current will take the path of least resistance through the closest annular flange contact area. This enables "mapping" the contact topography across the annular flange contact surface thereby allowing determination of any contact defect location. Mapping is enabled when the contact surface area is very large and could be applied anywhere mechanical contact of the face is critical for structural reasons.

FIG. 5 is a graph of circumferential position vs. micro-ohms from an exemplary measurement system 130. Circumferential position can be determined by a rotary encoder 136 removably attached to the rotor disk assembly 112 for generating rotary position and polar coordinates of the assembly 112. Using a low resistance ohmmeter, probes 120, 122 were attached to the outer rim 124 to form the third conductive path 118. As seen in FIG. 5, about 525 µΩ was the measured resistance with no shim in place, indicating sufficient contact. Using a 0.005 inch shim, about 500 µΩ was measured; using a 0.010 inch shim, about 275 µΩ was observed; and using a 0.020 inch shim, about 290 µΩ was observed. The about 200 µΩ variance is due to the reduction in cross sectional contact area of the annular flange joint 100; a very clear indicator the annular flange joint 100 is not making proper contact. The annular flange joint 100 contact topography can be further mapped, using electrical signature analysis or similar software, into a polar map similar to the one shown in FIG. 6. Relocating the test probes 120, 122, or using multiple test probes 120, 122, attached to predetermined locations on the outer rim 124 for applying current and potential can generate output 132. If sufficient surface contact is being made at the annular flange joint 100, the resistance will be high. If an air gap is present, the conductive path will change and the resistance will decrease. By introducing large amounts of current in predetermined positions across a large annular flange joint 100, the contact topography 132 can be measured and mapped to check the quality of annular flange contact during rotor stacking, thus improving first pass yield and reducing any rework cycle. Optionally, additional testing equipment can be used in the measurement system 130. For example, eddy current probes can be used alone or in combination with low resistance measurements for testing predetermined areas of the rotor stack assembly 112. These eddy current probes can be used to measure conductivity and/or resistivity of the annular flange joint 100 for performing topography imaging/mapping of the contact surface and identifying contact anomalies. Conductivity can also contain information related to the joint 100 mechanical properties and structural integrity. Eddy current evaluation software can be used to assist in contact topography mapping.

Figure 7:
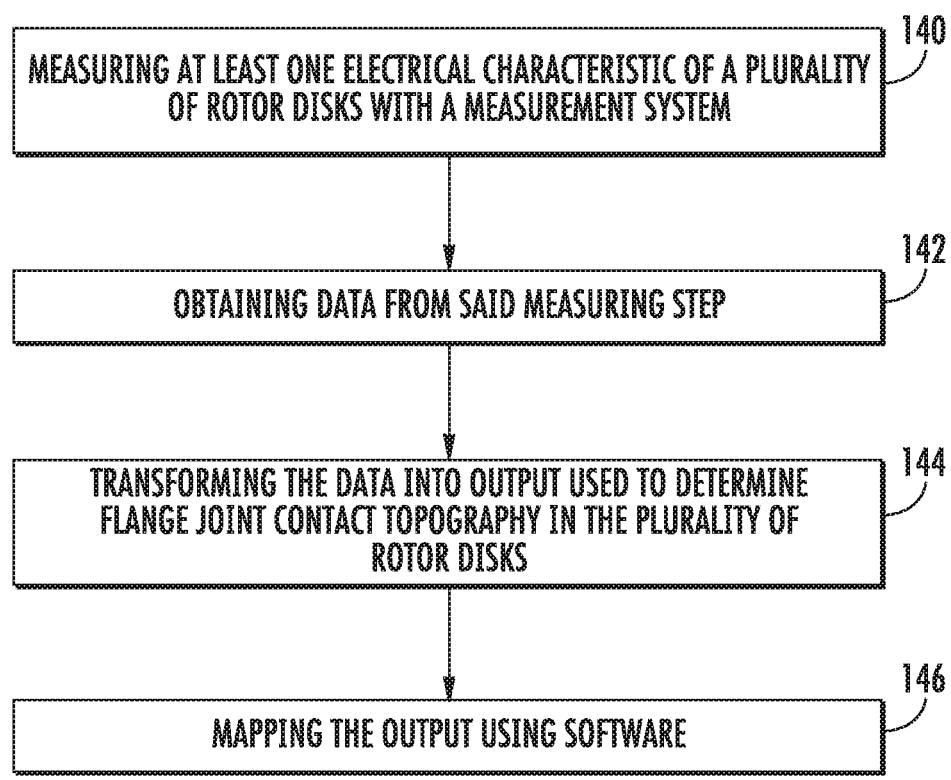
FIG. 7 is a block diagram of exemplary method steps for testing a rotor stack having a plurality of rotor disks.

FIG. 7 shows exemplary method steps 140, 142, 144, and 146 that can be performed for testing a rotor stack having a plurality of rotor disks 113. The block diagram illustrates the architecture, functionality, and operation of possible implementations of methods according to an embodiment of the present invention. In this regard, each block in block diagram may represent a module, segment, or portion of method, which comprises one or more executable steps for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for testing rotor stack assemblies, comprising:
    a plurality of rotor disks assembled into a rotor stack assembly with adjoining rotor disks of the plurality of rotor disks in contact at at least one flange joint;
    a measurement system for measuring electrical resistance of the plurality of rotor disks within the rotor stack assembly;
    a computer electronically connected to the measurement system for capturing data from the measurement system; and
    software associated with the computer for transforming the data into output used to determine flange joint contact topography in the plurality of rotor disks;
    wherein the software maps the contact topography between annular flanges of the adjoining rotor disks in the plurality of rotor disks.

2. The system of claim 1, wherein the contact topography comprises eccentricity and tilt between annular flanges of adjoining disks in the plurality of rotor disks.

3. The system of claim 1, wherein the measurement system comprises a plurality of electrical probes in contact with adjoining rotor disks.

4. The system of claim 3, wherein the plurality of electrical probes are configured as Kelvin clips, C-clamps, fixed points, helical spring points, and mixtures thereof.

5. The system of claim 4, wherein the measurement system comprises a rotary encoder for determining the position of each rotor in the plurality of rotor disks.

6. The system of claim 1, wherein the software comprises electrical signature analysis of the electrical resistance.

7. A method for testing a rotor stack having a plurality of rotor disks, comprising the steps of:
assembling the plurality of rotor disks into the rotor stack;
measuring electrical resistance of the plurality of rotor disks with a measurement system after assembling the plurality of rotor disks into the rotor stack;
obtaining data from said measuring step;
transforming the data into output used to determine flange joint contact topography in the plurality of rotor disks; and
mapping the output using software;
wherein the software maps the contact topography between annular flanges of adjoining disks in the plurality of rotor disks.

8. The method of claim 7, wherein the contact topography comprises eccentricity and tilt between annular flanges of adjoining disks in the plurality of rotor disks.

9. The method of claim 8, wherein the measurement step comprises contacting adjoining rotor disks with a plurality of electrical probes.

10. The method of claim 9, wherein the plurality of electrical probes are configured as Kelvin clips, C-clamps, fixed points, helical spring points, and mixtures thereof.

11. The method of claim 10, wherein the measurement step comprises determining the position of each rotor in the plurality of rotor disks using a rotary encoder.

12. The method of claim 7, wherein the software performs electrical signature analysis of the electrical resistance.

* * * * *